March 5, 1968   F. H. VAHLSING, JR   3,372,111
TREATMENT OF ALKALINE WASTES FROM POTATO PROCESSING
Filed Feb. 21, 1966
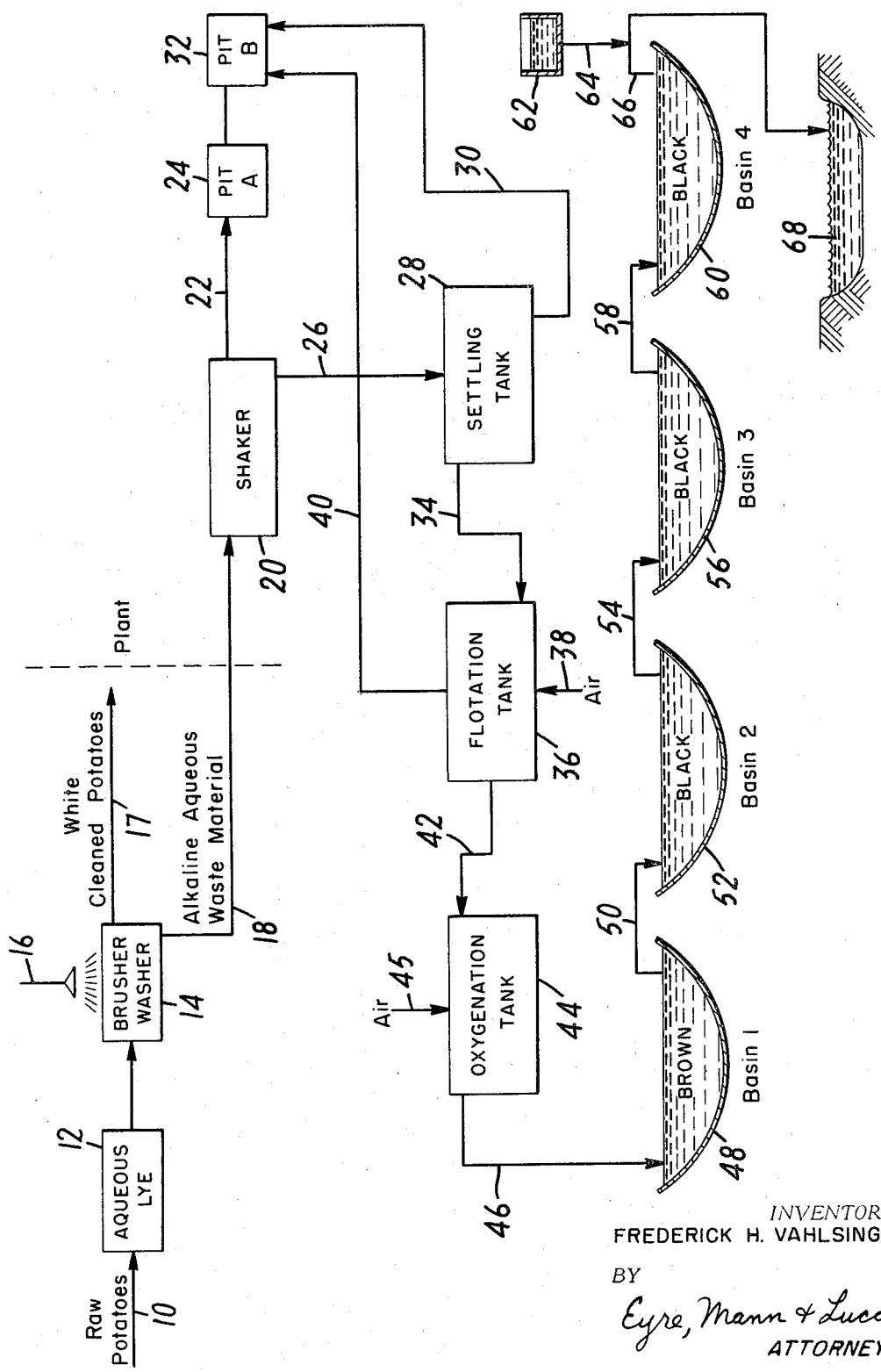
INVENTOR.
FREDERICK H. VAHLSING, JR.
BY
Eyre, Mann & Lucas
ATTORNEYS

United States Patent Office 3,372,111
Patented Mar. 5, 1968

3,372,111
TREATMENT OF ALKALINE WASTES FROM POTATO PROCESSING
Frederick H. Vahlsing, Jr., Allentown, N.J., assignor to Vahlsing, Inc., a corporation of Delaware
Filed Feb. 21, 1966, Ser. No. 529,089
4 Claims. (Cl. 210—62)

ABSTRACT OF THE DISCLOSURE

Disagreeable odor, color and hazardous bacterial content of liquid alkaline waste material, generated by potato processing operations which include a lye peeling step, are eliminated by removing relatively large-sized suspended solids from the waste material, oxygenating the waste material, ponding the waste material at least once and adding chlorine to the waste material in a concentration from about 1 to about 20 parts per million by weight.

---

This invention relates to a method of treating waste material originating from commercial potato processing operations. More particularly, the invention provides a method of treatment which in a surprising and unexpected manner eliminates the toxic and pollutant nature of aqueous alkaline waste material accumulated from potato processing operations which include a lye peeling step.

In large potato processing plants, raw potatoes are frequently peeled on an automatic, continuous basis by immersion in a hot aqueous lye solution followed by roller brushing and spray washing. The hot lye solution softens, gelatinizes and loosens the skin and underlying starch layer of the potatoes, whereby these portions can be easily removed by brushing with bristles and washing under jetted sprays of water. This yields cleaned white potatoes which are then processed to finished potato products, but there is also an accumulation of waste material which generally comprises an aqueous alkaline suspension of dirt, partially digested potato skins, gelatinized potato starch, chunks of potato solids and other foreign matter.

Heretofore, this waste material has been attempted to be disposed of by initially separating the large solid particles of the suspension into concentrated cakes or masses which then have been spread upon land to allow natural decomposition or in some cases the solid matter has been used as cattle feed. The remaining aqueous alkaline suspension of fine solids has been dumped into large basins or ponds, on the theory that the combination of exposure to air and long standing will result in natural bacterial decomposition of the organic solids therein. Unfortunately, this system has not lived up to expectations. Partly due to its alkaline pH and partly due to unfavorable environmental factors of cold or freezing temperatures, the ponded liquid waste material has not undergone bacterial decomposition in desired manner, but instead usually turns into a malodorous black liquid having an extremely disagreeable odor, color and appearance, and a very hazardous or toxic character as exemplified by bacterial coliform counts as high as 130,000 p.p.m. Thus, the potato processor is faced with the problem of accumulating waste material which acquires a toxic nature of most objectionable character and leads to serious pollution problems when discharged into streams, rivers or other bodies of fresh water.

It has now been discovered that the ugly black color, the disagreeable odor and the high bacteria count of the ponded liquid waste material described above can be virtually completely eliminated by a simple treatment of the waste material with small amounts of chlorine. More specifically, it has been found that the addition of chlorine or chlorine-generating hypochlorite salts to the ponded liquid waste material in small concentrations of about 1 to about 20 p.p.m. by weight has the remarkable effect of elimination of the black color and disagreeable odor noted above, plus reduction of the bacterial coliform count to substantially zero. Indeed, the waste material after receiving the stated chlorine treatment becomes substantially water-white, there being only a slightly noticeable milk-white haze to indicate that it is other than pure water.

The reasons why the relatively mild chlorine treatment of the invention gives such disproportionately greater benefits and advantages are not understood at this time. The nature of the substances and bacteria which are responsible for the development of bad color, odor and toxicity in the waste material are not known, but it has been proven to be a definite fact that these contaminants have a very high susceptibility to inhibition or destruction by contact with even very small concentrations of chlorine, which might ordinarily be considered ineffectual to one skilled in the art having familiarity with the waste material being treated. Thus, although definite explanations cannot be given at this time for the mechanism by which the invention works, the fact remains that when translated into the practical advantages and benefits which it provides in commercial potato processing, the invention has great importance and value.

Briefly summarized, the invention comprises the step of adding small amounts of chlorine to the waste alkaline aqueous suspension of fine solids which is accumulated from lye peeling of raw whole potatoes. The chlorine may be added directly as gas or as dissolved gas in an aqueous solution. For best results, however, the chlorine is added to the alkaline waste in the form of aqueous solutions of alkali metal or alkaline earth metal hypochlorite salts. Examples of these are calcium hydochlorite and sodium hypochlorite which are available as commercial products. The hypochlorite solutions, which may contain the hypochlorite salts in concentrations of about 5% to about 25% by weight, can be more conveniently stored and readily dispensed into the alkaline waste material in controlled manner to achieve the benefits of the invention with simplicity and efficiency.

As previously mentioned, the concentration of chlorine is very small and may be within the range from about 1 to about 20 p.p.m. by weight, p.p.m. signifying parts per million. Excellent results have been achieved in actual practice by addition of about 5 p.p.m. of sodium hypochlorite, in the form of a 12–15% aqueous solution, to the aqueous alkaline waste material after the waste material has been ponded in four successive basins and before it is discharged into a running stream. This is another surprising aspect of the invention in that the best results are achieved by addition of chlorine to ponded alkaline waste material, the term "ponded" signifying that the waste material has been exposed to the atmosphere by standing for relatively long periods in shallow basins or ponds. The ponding of the waste material gives rise to the development of the objectionable characteristics previously noted, viz. the black color, foul odor and toxic bacteria counts. Yet, when treated with small amounts of chlorine, these characteristics are virtually completely eliminated and the enhanced efficacy of the treatment of the invention in so destroying such characteristics, after they have been intensified by natural development in ponds, is quite surprising and unexpected.

While therefore it is recommended for best results that the chlorine treatment of the invention be applied to alkaline waste material which has been ponded, some advantages are also obtained if the chlorine is added to alkaline waste material which has been separated from the larger suspended solids but not ponded. In this case, the chlorine apparently acts with some sort of inhibiting effect which markedly reduces the development of the objectionable characteristics previously described if the waste material, so treated, is subsequently ponded. However, for reasons which are not presently understood, this inhibiting effect though of advantage is not equivalent to a similar treatment of ponded waste material with the same amount of chlorine. Thus, in order to achieve the best results, ponding of the waste material is definitely of advantage as a preliminary step to chlorine addition.

Further details of the invention will be readily apparent from the accompanying drawing which illustrates by flow and block diagram an example of a commercial potato processing operation which utilizes a lye peeling step and which thereby generates a liquid alkaline waste material, this waste material being treated in turn by the method of the invention.

Referring now to the drawing, raw potatoes are conveyed via line 10 to a tank 12 containing an aqueous solution of sodium hydroxide. The potatoes are immersed into this solution in conventional manner in order to soften, gelatinize and loosen the surface skin and underlying layer of potato starch to prepare the potatoes for actual peeling. As is known, the temperature, concentration of lye and time of immersion utilized in this hot lye treatment will vary according to the condition of potatoes, including their maturity and the source from which they have been cultivated. Exemplary conditions in the aqueous hot lye bath are a bath temperature of 180° F. with the bath containing about 10% of sodium hydroxide by weight and the potatoes being immersed therein for about three minutes. On the other hand, the conditions may be varied over temperatures of about 110° to 212° F., a sodium hydroxide concentration of 3% to about 25% by weight and an immersion time of 1 to 8 minutes.

Following immersion in the hot bath in tank 12, the potatoes are conveyed to a brusher-washer labeled 14 in the drawing. Here the potatoes are subjected to roller brushes and at the same time jets of water are sprayed upon the potatoes by means of the spray head 16. By these combined treatments the surface skin and underlying gelatinized starch layer of the potato are rubbed and peeled off, this being greatly aided by the lye treatment. The white cleaned potatoes are removed through the outflow line 17 for subsequent processing into finished products.

From the bottom of the brusher-washer station 14, the alkaline liquid waste material is removed and this material as previously noted generally comprises an aqueous alkaline suspension of dirt, partially digested potato skins, gelatinized potato starch, chunks of potato solids and other foreign matter. The pH of the alkaline waste material will be anywhere from about 8 to 12, depending on the specific conditions employed in the previous two processing steps.

The liquid alkaline waste material is conveyed through line 18 to a shaker labelled 20 in the drawing, the dashed line labelled "Plant" indicating that this and all subsequent operations on the waste material preferably take place outside the potato manufacturing plant. Here, the alkaline liquid waste material is placed upon an oscillating screen and shaked whereby particles having an average particle size greater than the size of the mesh of the screen will be retained and the remaining liquid alkaline waste material with the finer solids suspended therein will fall to the bottom of the shaker, Preferably the size of the mesh of the screen employed in shaker 20 is at least about 20 mesh, U.S. Standard Series. Other conventional means of separation, of course, can be employed in place of the shaker.

The solid matter removed by the shaker screen is conveyed through line 22 to a pit A (reference numeral 24) from whence it is periodically removed by mechanical means and then either spread out on land for natural decomposition or sometimes used as cattle feed. The liquid alkaline waste material falling to the bottom of shaker 20 is now conveyed through line 26 to a settling tank 28 and held there to permit further settlement and deposition of finer suspended solid material. This solid material is removed from the bottom of the settling tank 28 and conveyed via line 30 to another pit B (reference numeral 32) similar to pit 24. The solid material at pit 32 is disposed of in the same manner as described above for pit 24.

The remaining liquid alkaline waste material is removed from the settling tank 28 and conveyed through line 34 to a flotation tank 36. Air is blown into the bottom of flotation tank 36 by means of line 38 and this air is blown by fans up through the alkaline waste material entering from line 34. In this way additional fine suspended solid matter is floated to the top of the tank 36 from whence it is removed and conveyed through line 40 to pit 32 for disposal in the manner previously described. The liquid alkaline waste material is now removed from the center of flotation tank 36 in order to avoid as much as possible the removal of further solid materials and conveyed through line 42 into the top of an oxygenation tank 44.

Air or other oxygen-containing gas or, if desired, pure oxygen, is blown down into aeration tank 44 from the top in order to oxygenate the alkaline liquid waste material therein. Following this oxygenation, the liquid alkaline waste material is conveyed through line 46 into a shallow basin 48, preferably dug into earth.

At this point the liquid alkaline waste material will have a dark brown color and since it still may be at a warm temperature, some bacterial decomposition may occur in the first basin 48. However, the bacterial decomposition, if it takes places, is insufficient to eliminate the color, odor and other impurities contained in the alkaline liquid waste material.

At any rate, after a suitable holding period of about 48 hours the liquid alkaline waste material is removed from the basin 48 and conveyed through line 50 to a second basin 52. After a period of settlement and standing, the liquid alkaline waste material is removed as overflow from basin 52 and conveyed via line 54 to a third basin 56. Finally, the liquid alkaline waste material is again removed as overflow from basin 56 and conveyed via line 58 to a fourth basin 60.

The advantage of the multiple ponding operations which are achieved by means of the four basins 48, 52, 56 and 60 is that further solids can settle from the liquid alkaline waste material. However, as previously noted, in basins 52, 56 and 60, the liquid alkaline waste material will develop the characteristic black color and foul odor and high toxic bacteria counts which may be as high as about 130,000 coliform counts in parts per million. Thus the ponding technique alone is very much inadequate and insufficient to clear up the toxic and pollutant nature of the alkaline liquid waste material.

In accordance with the invention, a holding tank 62 is positioned to discharge liquid solution via line 64 into a line 66 leading out from basin 60 and into a running stream 68 into which the liquid alkaline waste material is to be discharged. The tank 62 is used to hold an aqueous solution of sodium hypochlorite, preferably containing from about 12 to 15% by weight of the sodium hypochlorite. This aqueous sodium hypochlorite solution is trickled into the line 66 conveying the liquid alkaline waste material. The rate of addition of the sodium hypochlorite solution is correlated to the rate of flow of the liquid alkaline waste material so that preferably about 5 p.p.m. of sodium hypochlorite by weight, expressed as solid sodium hypochlorite, is continuously added to the alkaline waste material. As previously described, this treatment will result in elimination of the black color and foul odor of the alkaline waste material, as well as reduction of its bacterial coliform count to substantially zero. Thus, the liquid alkaline waste material can be safely discharged into the stream 68 without causing pollution.

The foregoing detailed description constitutes one illustrative embodiment of the method of the invention, and other embodiments and specific ways of practicing the invention will be obvious to those skilled in the art. Thus, it will be understood that it is intended to cover all changes and modifications of the preferred embodiments of the invention, herein chosen for the purpose of illustration, which do not constitute departures from the spirit end scope of the invention.

The following is claimed:

1. In the treatment of liquid alkaline waste material resulting from potato processing which includes a lye peeling step, the method which comprises removing from said waste material any suspended solid matter therein having an average particle size greater than about 20 mesh, U.S. Standard Series, oxygenating said waste material, ponding said waste material at least once and adding chlorine to said waste material in a concentration of from about 1 to about 20 parts per million by weight.

2. A method as set forth in claim 1 wherein said chlorine is added in the form of an aqueous solution of sodium hypochlorite.

3. A method as set forth in claim 2 wherein said waste material is ponded four times in succession prior to said addition of sodium hypochlorite solution.

4. A method as set forth in claim 2 wherein said sodium hypochlorite is added to said waste material in a concentration of about 5 parts per million by weight, expressed as solid sodium hypochlorite.

References Cited

UNITED STATES PATENTS 3,180,924   4/1965   Corey _____ 210—8

OTHER REFERENCES

Gurnham, C. F.: Principles of Industrial Waste Treatment, 1955, John Wiley & Sons, Inc., New York, pp. 43 and 210–214.

Francis, R. L.: Characteristics of Potato Flake Processing Wastes, Journal WPCF, Mar. 1962, vol. 34, pp. 291–294.

MICHAEL E. ROGERS, *Primary Examiner*.

UNITED STATES PATENT OFFICE
CERTIFICATE OF CORRECTION

Patent No. 3,372,111                              March 5, 1968

Frederick H. Vahlsing, Jr.

It is hereby certified that error appears in the above numbered patent requiring correction and that the said Letters Patent should read as corrected below.

Column 6, line 14, for "3,180,924" read -- 3,180,824 --.

Signed and sealed this 20th day of May 1969.

(SEAL)
Attest:

Edward M. Fletcher, Jr.
Attesting Officer

Commissioner of Patents